United States Patent [19]

Evans et al.

[11] Patent Number: 5,504,829
[45] Date of Patent: Apr. 2, 1996

[54] OPTICAL FIBER FOR SOLITON TRANSMISSION AND METHOD OF MAKING

[75] Inventors: Alan F. Evans, Beaver Dams; Daniel A. Nolan, Corning, both of N.Y.

[73] Assignee: Corning Incorporated, New York, N.Y.

[21] Appl. No.: 172,937

[22] Filed: Dec. 27, 1993

[51] Int. Cl.[6] .................................................. G02B 6/10
[52] U.S. Cl. .......................................... 385/123; 385/122
[58] Field of Search ............................ 385/1, 4, 12, 13, 385/28, 96, 123, 122, 141, 142, 143

[56] References Cited

U.S. PATENT DOCUMENTS

| | | | |
|---|---|---|---|
| 3,779,628 | 12/1973 | Kapron et al. | 385/43 |
| 3,909,110 | 9/1975 | Marcuse | 385/28 |
| 4,261,639 | 4/1981 | Kogelnik et al. | 385/123 |
| 4,474,427 | 10/1984 | Hill et al. | 385/123 |
| 4,558,921 | 12/1985 | Hasegawa et al. | 350/96.29 |
| 4,641,914 | 2/1987 | Sheem | 385/29 |
| 4,792,207 | 12/1988 | Shaw et al. | 385/28 |
| 5,076,658 | 12/1991 | Hayden et al. | 385/1 |
| 5,082,349 | 1/1992 | Cordova-Plaza et al. | 385/28 |
| 5,140,656 | 8/1992 | Hasegawa et al. | 350/96.29 |
| 5,191,631 | 3/1993 | Rosenberg | 385/123 |
| 5,274,733 | 12/1993 | Prigent et al. | 385/123 |

FOREIGN PATENT DOCUMENTS

| | | | |
|---|---|---|---|
| 0356872 | 3/1990 | European Pat. Off. | 385/43 |
| 3620895 | 12/1987 | Germany | 385/43 |
| 60-241001 | 11/1985 | Japan | 385/28 |
| 1-239508 | 9/1989 | Japan | 385/28 |

OTHER PUBLICATIONS

C. Sien, "Concatenated Soliton Fibre Link", Electronics Letters, vol. 12, pp. 237–238 (1991) (no month).
K. Tajima, "Compensation of Soliton Broadening in Non-linear Optical Fibers with Loss", Optics Letters, vol. 12(1), pp. 54–56, 1987 (no month).
V. A. Bogatyrev et al., "A single–mode fiber with chromatic dispersion varying along the length", Journal of Lightwave Technology, vol. 9(5), pp. 561–566, 1991 (no month).
H. H. Kuehl, "Solitons on an Axially Nonuniform Optical Fiber", Optical Society of America, vol. 5, No. 3, Mar. 1988, pp. 708–713.

Primary Examiner—Rodney B. Bovernick
Assistant Examiner—John Ngo
Attorney, Agent, or Firm—William J. Simmons, Jr.

[57] ABSTRACT

A single-mode optical fiber suitable for the transmission of solitons has a refractive index profile that changes along the length of the fiber to provide a fiber dispersion that monotonically decreases along the fiber from one end thereof to the other. The fiber includes a core of maximum refractive index $n_1$ and a radius a, surrounded by cladding material having a refractive index $n_2$ which is less than $n_1$. The fiber core includes a central region that extends to the longitudinal axis of the fiber and an outer region, the inner and outer regions being separated by a region of depressed refractive index. The inner radius $a_i$ of the region of depressed refractive index is greater than zero and the maximum radius $a_o$ of the region of depressed refractive index is less than a. The fiber preform can be made by depositing layers of glass particles on an elongated mandrel, the composition of glass particles being varied with respect to longitudinal position along the preform during the deposition of some of the layers.

16 Claims, 6 Drawing Sheets

OPTICAL FIBER FOR SOLITON TRANSMISSION AND METHOD OF MAKING

BACKGROUND OF THE INVENTION

The present invention relates to high data rate optical fibers for telecommunication systems and to methods of making such fibers.

It has been known that solitons can be generated in optical fibers when the transmission power is in the nonlinear region. The optical soliton maintains its narrow temporal pulse as it propagates down the fiber because the dispersion is balanced with the nonlinear index. Mathematically this phenomenon is adequately described with the well known nonlinear Schroedinger equation. See, for example, the publication, C. Sien, "Concatenated Soliton Fibre Link", Electronics Letters, volume 12, pages 237–238 (1991). There are three important terms in the nonlinear Schroedinger equation. These terms relate to attenuation, the group velocity dispersion and the nonlinear index effects. The balancing of the group velocity dispersion with the nonlinear index term has received much attention to date and is well known. However, pulses propagating in real fibers undergo attenuation; this can cause soliton pulses to develop frequency chirping and subsequent broadening and to then become essentially linear.

As used herein the term "dispersion" means group velocity dispersion, which is the total of the material dispersion and the refractive index profile dispersion.

It has been proposed that a soliton can survive in a fiber with loss if the group velocity dispersion can be made to decrease approximately exponentially with distance (K. Tajima, "Compensation of Soliton Broadening in Nonlinear Optical Fibers with Loss", Optics Letters, volume 12(1), pp. 54–56, 1987). In this way, the group velocity dispersion is made to continuously change so that it matches the changing power level. That publication states that this can be accomplished by varying the core diameter through fiber tapering and that such a fiber can be manufactured by controlling the fiber draw speed. Such a fiber is illustrated in FIG. 1 wherein the diameter of fiber 5 exponentially decreases from the large diameter input end 6 to the small diameter output end 7. The diameter of the core of fiber 5 is proportional to the outside diameter of the fiber. In the theoretical example proposed by Tajima the effective core diameter of such a fiber changes exponentially from about 10 μm to about 5 μm over 100 kms.

A dispersion decreasing fiber was actually made by varying the speed of the fiber draw to change the fiber outer diameter from 175 μm to 115 μm, whereby the measured dispersion decreased from 10 ps/nm-km to 1 ps/nm-km over a 1 km length (V. A. Bogatyrev et al., "A single-mode fiber with chromatic dispersion varying along the length", Journal of Lightwave Technology, volume 9(5), pages 561–566, 1991). Subsequently, that fiber was used to generate a continuous soliton pulse train at 70 Gb/s (S.V. Chernikov, "70 Gbit/s fibre based source of fundamental solitons at 1550 nm", Electronics Letters, volume 28(13), pages 1210–1211, 1992). Such fibers have potential application in ultrahigh bit rate telecommunication systems of the type schematically illustrated in the soliton communication system of FIG. 2. A pulse train is input to amplifier 11 and coupled to dispersion decreasing fiber DDF-15, the dispersion at the input end a being greater than that at output end b. After propagating a distance that is limited by the maximum dispersion change, the optical signal is again amplified at amplifier 12 and coupled to dispersion decreasing fiber DDF-16, which has a high dispersion end a adjacent amplifier 12 and a low dispersion end b adjacent amplifier 13.

It has also been suggested that dispersion-decreasing fiber may be useful in a soliton communication line to extend the distance between amplifiers 11 and 12, for example. While there clearly could be numerous applications of dispersion-decreasing fiber, a tapered fiber, in which the outside diameter as well as the core diameter changes to the extent proposed in the Tajima and Bogatyrev et al. publications, will result in problems with splicing and cabling, for example.

SUMMARY OF THE INVENTION

It is therefore an object of the present invention to provide a method of making a dispersion decreasing optical fiber in which an axial change in dispersion is not totally dependent upon a change in the outside diameter of the fiber. A further object is to provide an optical fiber in which the dispersion varies along the length thereof, while the outside diameter of the fiber is substantially constant or contains minimal variation.

Briefly, the present invention relates to a single-mode optical waveguide fiber comprising a core and a layer of cladding material on the outer surface of the core. The outside diameter of the fiber is substantially constant along its length. The refractive index profile of the core is such that fiber dispersion monotonically decreases along the fiber from one end thereof to the other.

The core diameter can be substantially constant throughout the length of the fiber, or it can continually change throughout the length of the fiber.

The core can include a central region and an outer region that are separated by a transition region where the refractive index abruptly changes from that of the central region to that of the outer region. Examples of such a transition region are (a) a region of depressed refractive index that is lower than the refractive index of the inner and outer regions, and (b) a region between central and outer regions of a fiber wherein both regions have a step-type refractive index profile.

The core can include a central region that extends to the longitudinal axis of the fiber and an outer region located outside that core radius where power increases with longer wavelength, the radius and refractive index profile of the outer region being such that it balances the dispersion effects of the inner core region and provides the fiber with the desired dispersion value. The minimum refractive index of the central region can be equal to the maximum refractive index of the outer region. Furthermore, both the central region and the outer region can have step-type refractive index profiles.

In accordance with one aspect of the invention the outside diameter of the fiber is substantially constant throughout its length, and the refractive profile of the fiber continually changes from one end thereof to the other. In accordance with a further aspect of the invention the fiber can comprise a plurality of fiber sections that are fused together in series, the dispersion of each fiber section being substantially constant throughout its length. The fiber section at a first end of the series has a given dispersion, and the fiber section at the opposite end of the series has a dispersion lower than the given dispersion. The dispersion of each of the remaining fibers sections is intermediate the dispersions of the fiber sections at opposite ends thereof.

This invention also concerns methods of making dispersion decreasing optical fibers. In accordance with one embodiment, a core preform is formed by flowing a base glass reactant and a dopant glass reactant to a reaction zone adjacent to an elongated substrate and moving the reaction zone from one end of the substrate to the other end of the substrate to form a layer. The deposition of layers is continued to form a preform. During the deposition of a portion of the preform, the flow rate of the dopant glass reactant is varied in accordance with a given recipe as the reaction zone moves longitudinally along the substrate to form one of the layers. The flow rate of the dopant glass reactant varies in accordance with a recipe different from the given recipe as the reaction zone moves longitudinally along the substrate to form a layer adjacent to the one layer.

In another embodiment, an optical fiber core preform is formed by depositing on an elongated mandrel a plurality of coatings of glass particles, each coating being formed of a plurality of layers of glass particles, each coating having a unique refractive index profile. The mandrel is removed to form a porous preform, and the porous preform is heated to form a dense glass preform. The improvement comprises depositing one of the coatings such that its thickness is nonuniform, the thickness of the one coating being greater at one end of the preform than its thickness at the opposite end of the preform. The tapering thickness coating could be the first deposited coating, or it could be deposited between two coatings.

DESCRIPTION OF THE PREFERRED EMBODIMENTS

In potential applications of dispersion-decreasing fiber, it is desirable to achieve a large variation in dispersion between the input and output ends of the fiber. Additionally, for soliton transmission, the dispersion must remain positive and become very small or reach zero by the output end of the fiber. Other fiber characteristics that must be considered are mode field diameter and cutoff wavelength, since refractive index modifications that affect dispersion can also affect these characteristics.

Since solitons require low loss operation, it is preferable to operate in the 1550 nm region of the electromagnetic spectrum where silica based optical fibers exhibit extremely low loss. Dispersion-shifted fiber made in accordance with the teachings of U.S. Pat. No. 4,715,679 can be designed for zero dispersion at about 1550 nm. Dispersion-shifted fiber is further discussed in the publications: T. D. Croft et al. "Low-Loss Dispersion-Shifted Single-Mode Fiber Manufactured by th OVD Process", Journal of Lightwave Technology, Volume LT-3, No. 5, Oct. 1985, pp. 9313–934; and V. A. Bhagavatula et al. "Bend-Optimized Dispersion-Shifted Single-Mode Designs", Journal of Lightwave Technology, Volume LT-3, No. 5, Oct. 1985, pp. 954–957.

Figure 1:
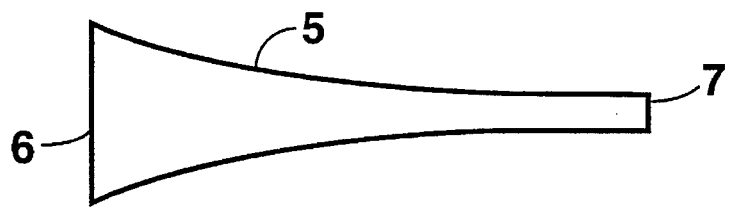
FIG. 1 is a schematic illustration of a prior art optical fiber for soliton propagation.
Figure 2:
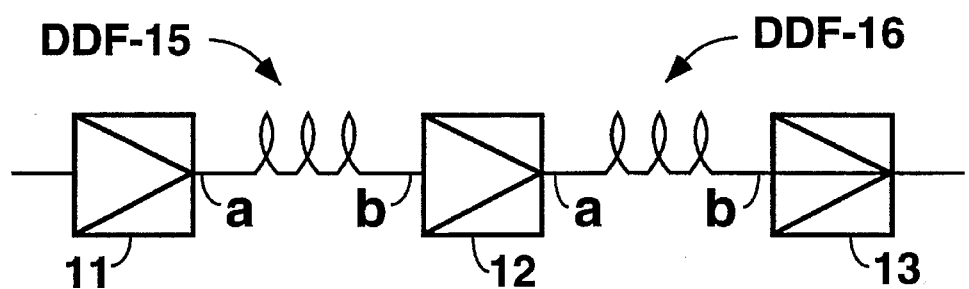
FIG. 2 schematically depicts a soliton communication system employing dispersion decreasing optical fibers.
Figure 3:
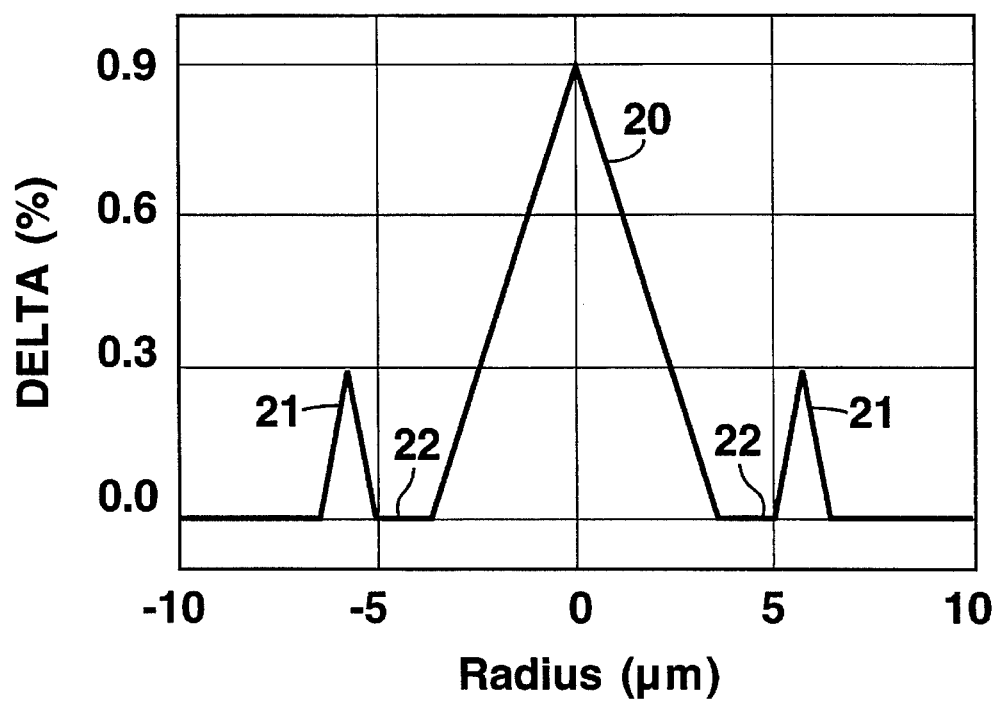
FIG. 3 is a refractive index profile of the core of a dispersion shifted single-mode optical fiber.

FIG. 3 illustrates the refractive index profile of a typical, commercially available dispersion shifted fiber exhibiting zero dispersion at 1550 nm. The fiber core comprises a central core region 20 that is separated from an outer ring 21 by a region 22 of depressed refractive index. The diameter of its central triangular region 20 is 7.20 µm, and the inner and outer diameters of ring 21 are 10.08 µm and 12.94 µm, respectively. The peak refractive index values of regions 20 and 21 (expressed as $\Delta_p$) are 0.9% and 0.3%, respectively. The term $\Delta_p$ is the relative refractive index of the core with respect to that of the cladding and is given by $$\Delta_p = (N_1^2 - n_2^2)/2n_1^2$$

where $n_1$ is the peak refractive index of the core region and $n_2$ is the refractive index of the cladding. For simplicity of expression, $\Delta$ is often expressed in percent, i.e. one hundred times $\Delta$. It is noted that some processes for producing optical fibers result in a refractive index depression at the fiber centerline. In such a fiber, $n_1$ refers to the maximum refractive index of the central core region.

In accordance with one aspect of the invention, the refractive index profile of a dispersion decreasing optical fiber is a variation of the dispersion shifted profile of FIG. 3 throughout its length, the profile constantly changing along the fiber length to provide the required change from a relatively large dispersion at the input end to a relatively low or zero dispersion at the output end. In a preferred embodiment, the profile at the output end of the fiber is the dispersion-shifted profile that produces essentially zero dispersion at the operating wavelength. Some of these profiles offer the advantage of achieving large dispersion change with minimal refractive index profile variation. However, a design tradeoff exists between the complexity of the modified profile and the range of possible values of the group velocity dispersion. Designs for varying the cross-sectional refractive index profile as a function of length can be conveniently divided into three types:

Type I— those that leave the central core region of the nominal dispersion-shifted fiber of FIG. 3 unchanged, only the outer ring structure being modified;

Type II—those that modify only the central core region; and

Type III— those that modify both the central region and the ring region.

The Type I group of profiles requires fewer changes in the glass particle deposition step of the fiber core fabrication process, since the central core region remains unchanged throughout the length of the fiber. However, they also have a smaller range of potential dispersion change. Two further constraints limiting possible profiles are that the fiber must remain single mode and dispersion must remain positive.

Table 1 lists parameters associated with the refractive index profiles of FIGS. 3, 4(a) through 4(j) and FIG. 5(a) through 5(d). The values of dispersion, mode-field diameter and cut-off wavelength listed in Table 1 have been derived by computer simulation techniques.

TABLE 1

Figure 4A:
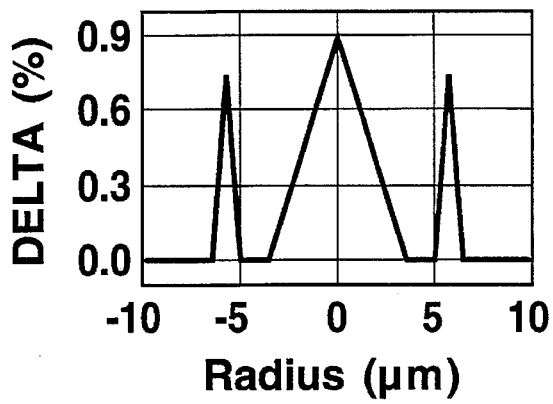
FIGS. 4(a) to 4(j) and FIGS. 5(a) to 5(d) are refractive index profiles of cores at the input and/or output ends of single-mode optical fibers made in accordance with the invention.
Figure 4B:
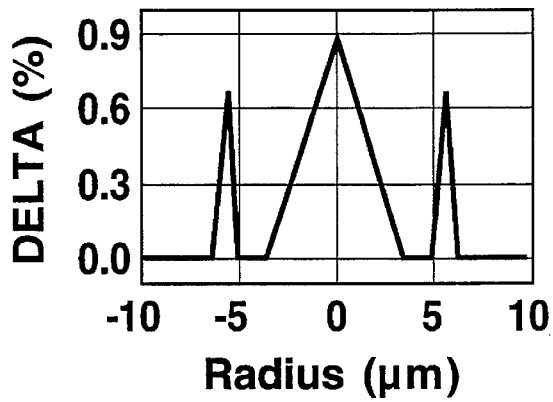
Figure 4C:
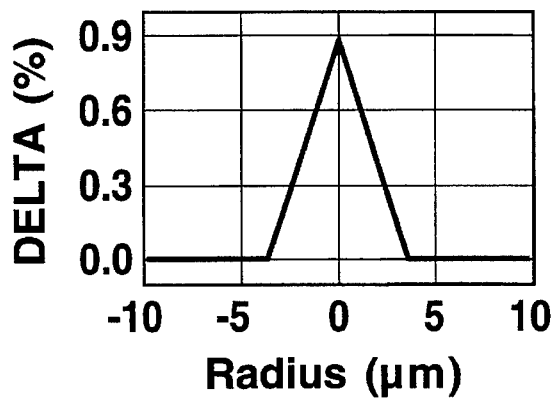
Figure 4D:
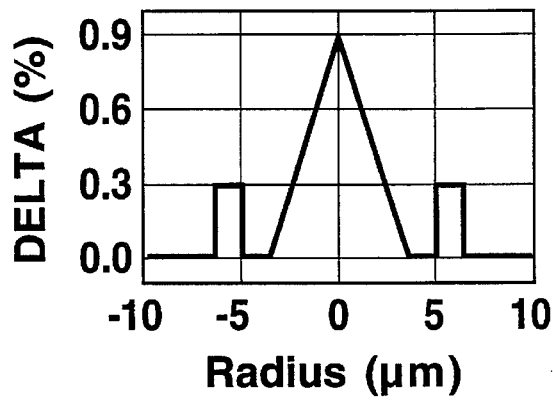
Figure 4E:
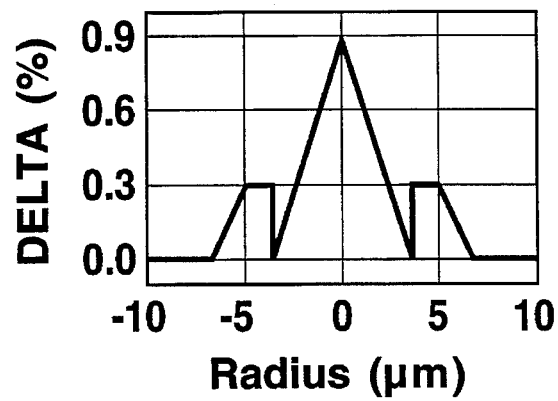
Figure 4F:
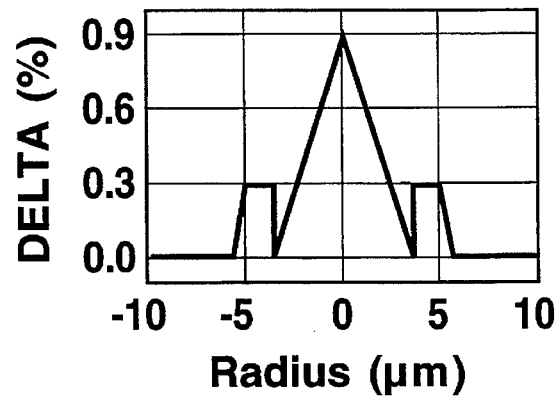
Figure 4G:
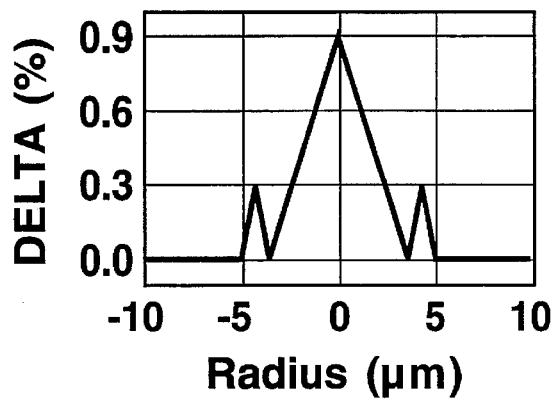
Figure 4H:
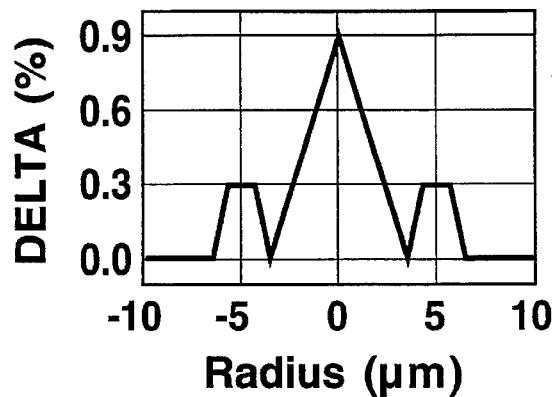
Figure 4I:
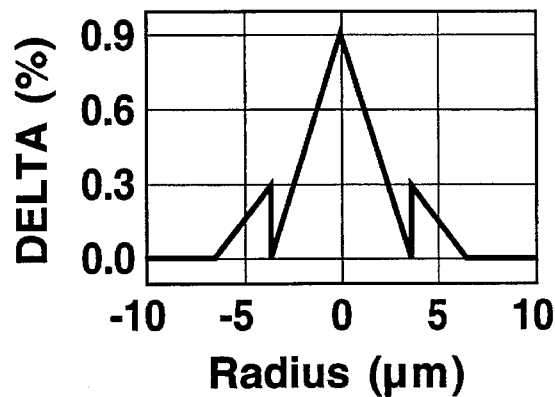
Figure 4J:
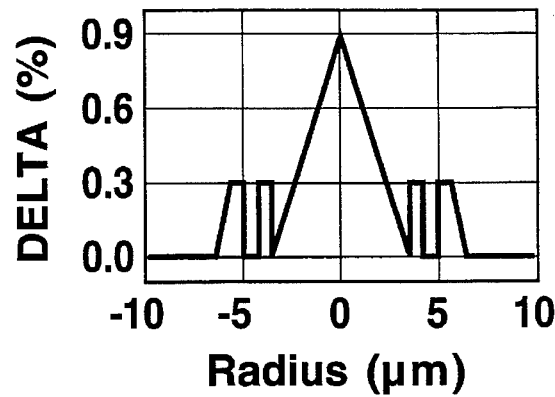
Figure 5A:
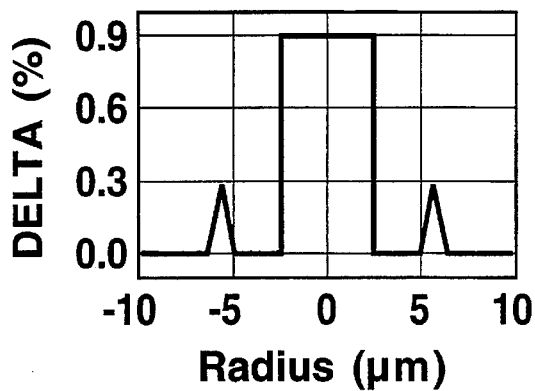
Figure 5B:
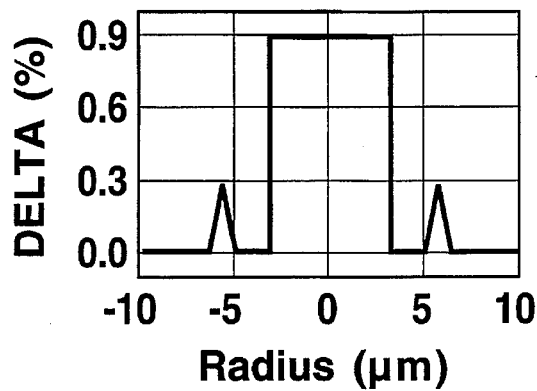
Figure 5C:
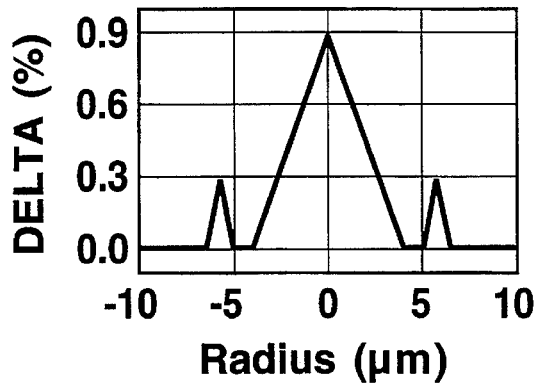
Figure 5D:
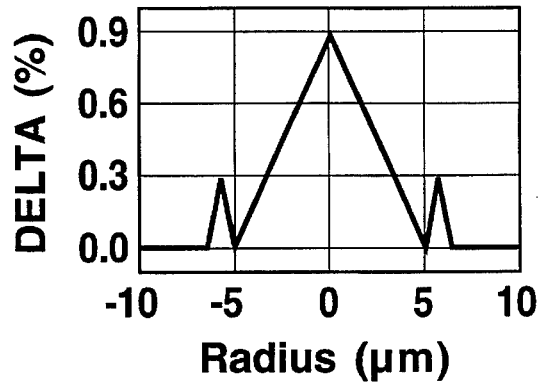

| Profile | Dispersion (ps/nm/km) at 1550 nm | Mode Field Diameter (μm) | Cutoff Wavelength, $\lambda_c$ (nm) |
| --- | --- | --- | --- |
| FIG. 3 | 0.0 | 8.7 | 1106 |
| FIG. 4(a) | 1.978 | 10.1 | 1524 |
| FIG. 4(b) | 1.485 | 9.9 | 1480 |
| FIG. 4(c) | 0.919 | 9.5 | 936 |
| FIG. 4(d) | 0.599 | 9.5 | 1372 |
| FIG. 4(e) | 7.267 | 10.3 | 1526 |
| FIG. 4(f) | 7.794 | 10.0 | 1385 |
| FIG. 4(g) | 2.969 | 9.2 | 1089 |
| FIG. 4(h) | 7.267 | 10.3 | 1526 |
| FIG. 4(i) | 6.386 | 9.3 | 1277 |
| FIG. 4(j) | 5.794 | 9.7 | 1393 |
| FIG. 5(a) | 3.513 | 6.4 | 1276 |
| FIG. 5(b) | 14.396 | 6.8 | 1552 |
| FIG. 5(c) | 2.940 | 8.4 | 1193 |
| FIG. 5(d) | 8.902 | 8.3 | 1447 |

Type I profiles are illustrated in FIGS. 3 and 4(a) through 4(j); these profiles differ in that the rings of the outer core region have different doping concentrations and shapes, the ring completely disappearing in FIG. 4(c). The characteristics for these types of profiles are summarized in Table 1. The optical characteristics of fibers represented by FIGS. 4(a) through 4(j) are such that any of those fibers could be employed at the high dispersion input end of a dispersion decreasing fiber, provided that a profile of lower dispersion exists at the opposite end. For example, any of the profiles represented by FIGS. 4(a) through 4(j) could be employed at the high dispersion input end of the fiber if the profile represented by FIG. 3 were employed at the low dispersion output end. In another example, the profile represented by FIG. 4(i) could be employed at the high dispersion end of the fiber and the profile represented by FIG. 4(g) could be employed at the low dispersion end. Fibers having the profiles of FIGS. 4(a) through 4(d) and 4(g) exhibit dispersions less than 3 ps/nm/km. Thus, such fibers would not produce enough dispersion change to make them useful in systems with large discrete amplifier spacing unless the core was also provided with taper, such as by varying the speed of the fiber draw operation.

Table 1 reveals that the largest dispersion occurs in profiles where there is a sharp edge near the core center (see FIGS. 4(e), 4(f) and 4(i), for example). However, practical considerations such as germanium oxide diffusion may limit the sharpness of profile edges. For this reason, out the family of profiles that includes the profiles of FIGS. 4(e) through 4(j), the profile of FIGS. 4(g) and 4(h) may be easier to fabricate.

Table 1 also reveals that dispersion increases as the diameter of the central core region increases; compare the dispersions of the profiles of FIGS. 5(c) and 5(d) with the zero dispersion produced by the profile of FIG. 3.

The Table 1 entries for FIGS. 5(a) and 5(b) illustrate that large dispersion at reasonable mode field diameter can be achieved by making the central core region flat-topped. A comparison between FIGS. 5(a) and 5(b) shows that dispersion is highly sensitive to the location of the outer radius of the central core portion. It would also be sensitive to its slope. Furthermore, changes in the ring profile could be used to tailor the mode field diameter or cut-off wavelength.

Figure 6:
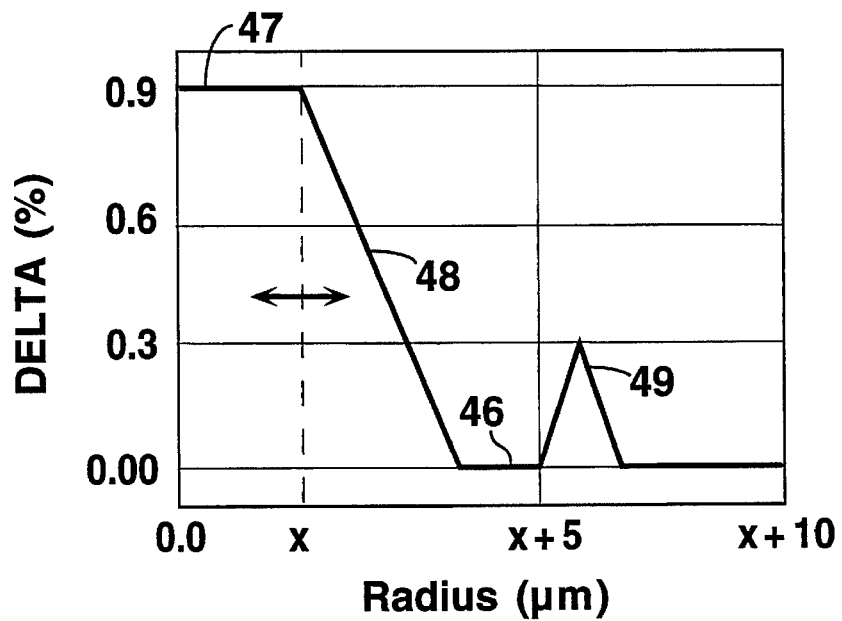
FIGS. 6 and 8 are refractive index profiles of two types of optical fibers having flat-topped central core regions.
Figure 7:
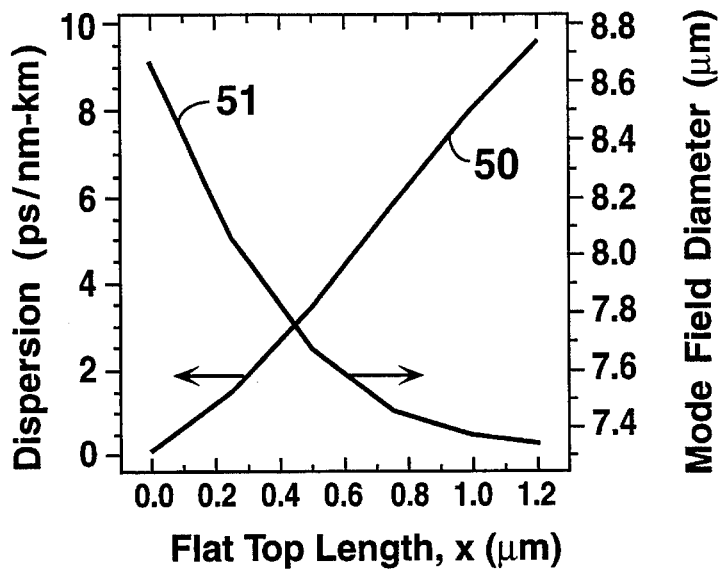
FIGS. 7 and 9 are graphs in which both dispersion and mode field diameter are plotted as a function of flat top length x for the profiles of FIGS. 6 and 8, respectively.
Figure 8:
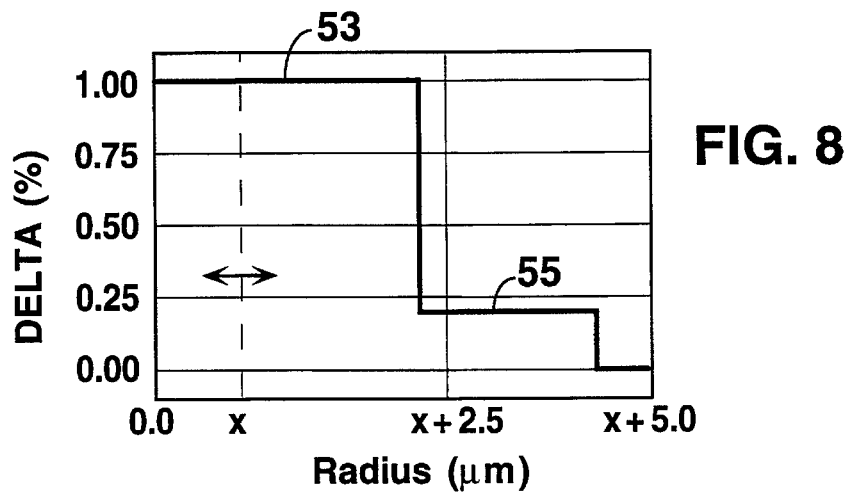
Figure 9:
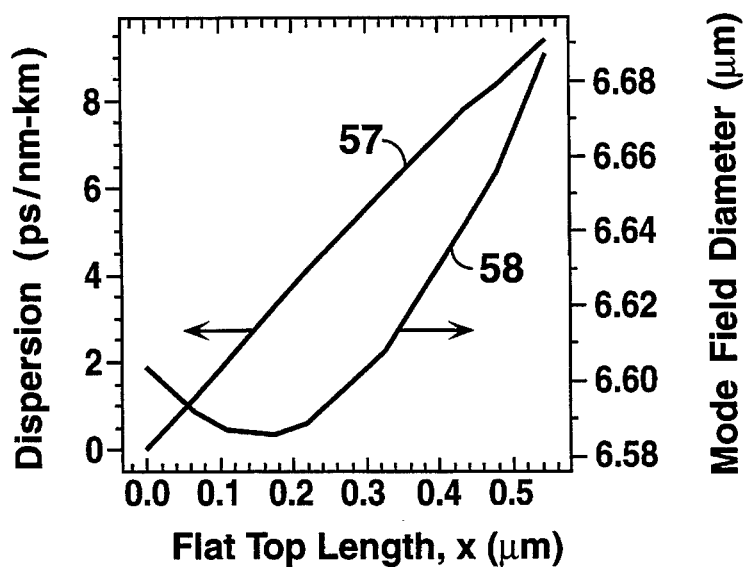

Further examples of flat-topped refractive index profiles are illustrated in FIGS. 6 and 8, the dispersion and mode field diameters of those profiles being illustrated in FIGS. 7 and 9, respectively. When x equals zero, the profiles of FIGS. 6 and 8 are optimized for zero dispersion in the 1550 nm range. The following discussion shows that large positive dispersion can be introduced by inserting the flat-topped central region. The addition of such a flat-topped central region to any optimized zero dispersion profile can introduce large positive dispersion.

In the refractive index profile of FIG. 6 the central core region comprises a flat-topped portion 47 and a region 48, the refractive index of which decreases with radius. The radius of region 47 is x μm. Spaced from the central core region is annular outer core region 49. If x equalled zero, the profile would be the same as that of FIG. 3. If the radius of portion 47 were x μm, then the inner radius of region 49 would be (x+5) μm.

FIG. 7 is a graph in which both dispersion and mode field diameter are plotted as a function of flat top length x. Curves 50 and 51 respectively show that dispersion increases and mode filed diameter decreases with an increase in flat top length x.

In the refractive index profile of FIG. 8 the central core region comprises a flat-topped central core region 53 of given refractive index surrounded by outer core region 55 of refractive index lower than the given refractive index. This type of refractive index profile is similar to taught in U.S. Pat. No. 4,755,022 (Ohashi et al) which is incorporated herein by reference. Whereas regions 53 and 55 are illustrated as being step-type profiles, they could be graded as suggested by the Ohashi et al. patent.

Curve 57 of FIG. 9 shows that dispersion increases with an increase in flat top length x. Mode field diameter (curve 58) first decreases and then increases as x increases from zero to about 5 μm.

There is a common feature in the refractive index profiles of FIGS. 6 and 8. Each has a central core region and an outer core region of lower refractive index than the central region. The outer region acts as a high index mass which is located outside that core radius where the power increases with longer wavelength. The extent of the mass is determined by its refractive index profile, which includes its radius. The index profile can be designed such the power weighted integral of the mass of the outer core region balances that of the inner core region giving the desired dispersion value, which may be zero. An index depression such as depression 46 of FIG. 6 allows more flexibility in placing the outer mass where it will have desirable effects on the other fiber properties such as mode field diameter and cutoff wavelength.

Figure 10:
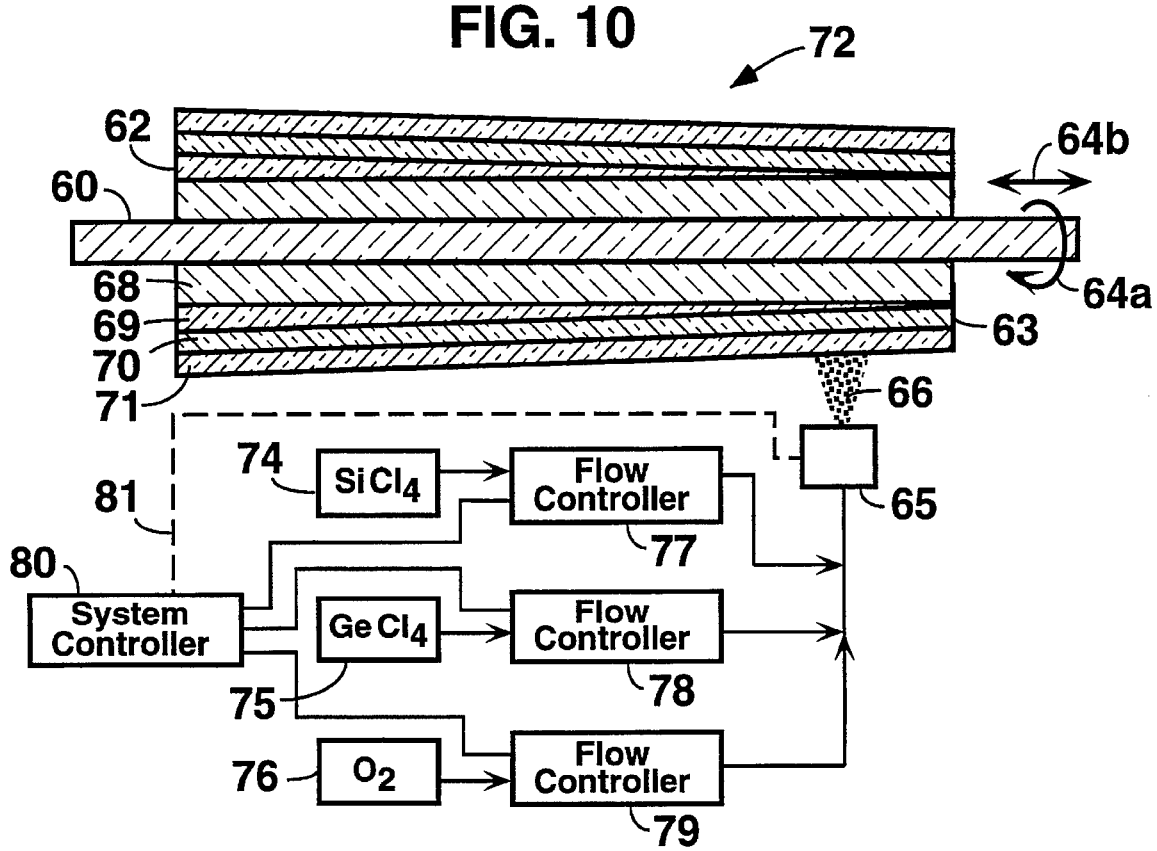
FIG. 10 is a schematic illustration of an apparatus that can be employed to form the optical fibers of the present invention.
Figure 11:
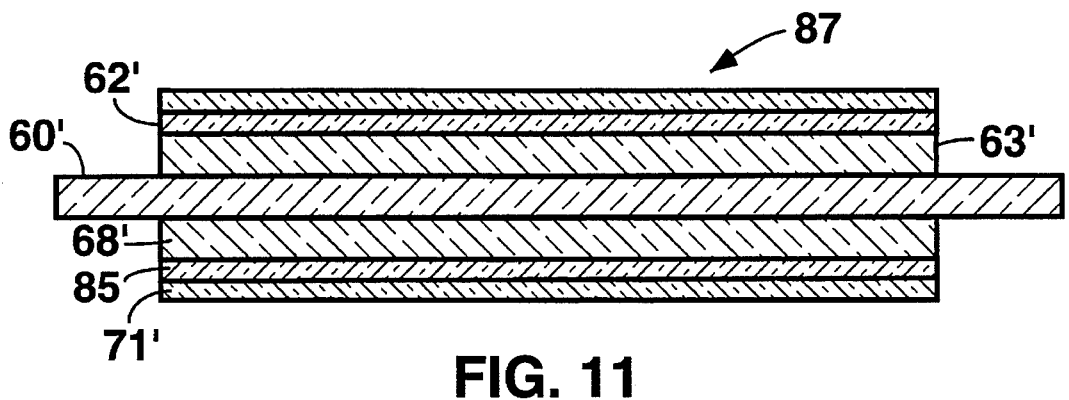
FIG. 11 is a cross-sectional view of a porous core preform formed by a modified process.

Decreasing dispersion single-mode optical fibers can be made by the apparatus of FIGS. 10 and 11 which illustrate two variations of the outside vapor deposition (OVD) process wherein glass particles are deposited on the longitudinal surface of a andrel. Other glass deposition processes could be employed to form dispersion decreasing fibers or at least portions thereof. Examples of such processes are the modified chemical deposition (MCVD) process whereby glass layers are deposited on the inner surface of a substrate tube and the axial vapor deposition (AVD) process.

Referring to FIG. 10, a mandrel 60 of silica or other high temperature material is rotated and translated along its longitudinal axis as shown by arrows 64a and 64b, respectively. Burner 65 produces a stream 66 of glass particles which deposits on mandrel 60, each pass of the burner depositing an adherent layer. Each of the coatings 68, 69, 70 and 71 is formed of a plurality of such layers. The speed of burner traverse can be varied.

Each coating is formed of glass particles comprising a base glass such as silica, and it optionally contains a dopant such as $GeO_2$. To form such particles, reactants such as $SiCl_4$ and $GeCl_4$ are supplied along with oxygen to burner 65. In the system of FIG. 10, vapors of $SiCl_4$ and $GeCl_4$ are formed in reservoirs 74 and 75, respectively. These vapors are metered by flow controllers 77 and 78, respectively, as taught in U.S. Patent 4,314,837. Alternatively, the reactants could be metered in liquid form and thereafter vaporized. Oxygen from source 76 is metered by flow controller 79. The amount of reactants flowing through controllers 77, 78 and 79 is controlled by system controller 80. In accordance with one embodiment, the flow of all reactants remains constant during the deposition of an entire layer of glass particles. In a second embodiment, the flow of one or more of the reactants can vary as the longitudinal position of the burner with respect to the mandrel changes. Dashed line 81 connecting burner 65 to system controller 80 is illustrative of the fact that controller 80 is provided with a signal indicative of the position of the burner in the second embodiment.

Assume that it is desired to form an optical fiber having the refractive index profile of FIG. 4(g) at one end and that of FIG. 3 at the opposite end. If the entire fiber is to be 25 km long, for example, preform 72 can be deposited such that it can be drawn to a length of 25 km. In the profiles of FIGS. 4(g) and 3, the central core region has a diameter of 7.2 μm and a $\Delta_p$ of 0.9%. Also, in FIGS. 4(g) and 3, the radial width of the outer core region or ring is 1.43 μm. The only difference between the profiles of FIGS. 4(g) and 3 is the position of the outer core regions. In FIG. 4(g), those regions are immediately adjacent the central core region, and in FIG. 3 those regions are separated from the central core region by 1.44 μm in the resultant fiber.

One technique for forming such a fiber would be to first form coating 68 by depositing the first layer thereof such that it contains $SiO_2$ doped with a sufficient amount of $GeO_2$ to provide a $\Delta_p$ of 0.9%. In each subsequent layer, the amount of $GeCl_4$ flowing to the burner is decreased until the last layer contains the smallest incremental amount of $GeO_2$ (corresponding to the fiber radius of 3.6 μm). With the flow of $GeCl_4$ turned off, a coating 69 of pure silica ($SiO_2$) is deposited in a thickness which varies from a predetermined thickness at end 62 of the preform to zero thickness at end 63. This can be accomplished by providing a predetermined flow of $SiCl_4$ at end 62 and decreasing the flow of $SiCl_4$ until it is completely cut off when the burner reaches end 63. Alternatively, the flow rate of $SiCl_4$ could remain constant and the burner speed could be varied. Coating 70 is then formed by depositing a plurality of layers of glass particles, the first of which contains no $GeO_2$, ramping the flow of $GeCl_4$ so that the middle layer contains sufficient $GeO_2$ to provide a $\Delta_p$ of 0.3%, and thereafter decreasing the flow rate of $GeCl_4$ until the deposition of the outer layer which contains no $GeO_2$. An outer coating 71 of pure $SiO_2$ can then be deposited. Layer 71 could have a uniform thickness as shown in FIG. 10. Alternatively, it could be deposited such that its thickness at end 63 is greater than its thickness at end 62, whereby it counteracts the effect of layer 69 and causes the diameter of core preform 72 to be uniform throughout its length. Preform 72 is preferably consolidated prior to applying the remainder of the cladding glass particles thereto. This can be done by removing mandrel 60 from the porous preform and then heating the preform in a consolidation furnace to a temperature sufficiently high to consolidate the glass particles and form a solid glass core preform. The solid core preform is then inserted into chucks so that it can be rotated and translated with respect to burner 65 to deposit a layer of pure silica particles. The resultant fiber preform is consolidated to form a draw blank from which optical fibers are drawn.

Rather than forming a blank from which one length of dispersion decreasing fiber can be drawn, a larger blank can be formed, and many such fibers can be drawn from it. The pattern of coatings shown in FIG. 10 would be repeated along the length of the preform. Thus, when the preform is drawn into fiber, the dispersion would decrease from a high value to a low value along one section of the drawn fiber having a length of 25 km, for example. Then the dispersion would abruptly increase to the high value and decrease along the next 25 km. This pattern of decreasing dispersion would be repeated for all of the fiber lengths drawn from the blank.

An alternative preform deposition embodiment is shown in FIG. 11 wherein elements similar to those of FIG. 10 are represented by primed reference numerals. Tapered layer 69 of FIG. 10 is not deposited. Rather, after central core region 68' is deposited, the flow rate of $GeCl_4$ (and optionally the flow rate of $SiCl_4$) is gradually changed as the burner traverses from end 62' to end 63' of the preform. After deposition of coating 68', the flow rate of $GeCl_4$ is zero and that of $SiCl_4$ is at a maximum. At this point in the process, the burner (not shown) could be positioned at end 62' where the profile of FIG. 3 is to be formed. During the first pass of the burner along the preform during the formation of coating 85, the flow rate of $GeCl_4$ would therefor be zero at end 62', and $GeCl_4$ would begin to flow only at end 63'. During the second pass of the burner along the preform during the formation of coating 85, the flow rate of $GeCl_4$ would begin at some incremental distance from end 63', and it would increase as the burner approached end 63'. At that pass corresponding to the deposition of the middle of depressed index region 22 at end 62', the burner would be supplied with sufficient $GeCl_4$ at end 63' to form glass particles having a $\Delta_p$ of 0.3%, corresponding to the peak index of the outer region of FIG. 4(g). At that point in the process when $GeCl_4$ is being fed to the burner to just begin to form the inner radius of index ring 21 (FIG. 3) at end 62', the $GeCl_4$ will cease flowing during the remainder of the pass. This kind of ramped flow of $GeCl_4$ to the burner continues until the last pass of the formation of coating 85, when no $GeCl_4$ flows since the outer portion of ring 21 (FIG. 3) contains no $GEO_2$, and the corresponding radius of the profile of FIG. 4(g) contains no $GeO_2$. A coating 71' of $SiO_2$ can then be deposited as described above. Preform 87 can then be consolidated, overclad with $SiO_2$, and drawn into a fiber.

In a similar manner, any of the disclosed refractive index profiles could be deposited at one end of the preform, and any of the remaining refractive index profiles could be deposited at the other end of the preform, the profile gradually changing from that at the one end to that at the remaining end.

The embodiments of FIGS. 6 and 8 could be formed by initially depositing a wedge-shaped coating on mandrel 60. The refractive index of the entire wedge-shaped coating would be that of core region 47 or 53. Thereafter coatings of uniform thickness would be formed. The thickness of the wedge-shaped coating would be such that, in the resultant fiber, the radius of the inner core region at one end of the fiber would be x μm larger than the radius at the other end of the fiber.

An example of a dispersion decreasing fiber that would require no variable thickness region, such as region 69, would be a fiber having the profile of FIG. 4(d) at one end and the profile of FIG. 3 at the other end. The radial positions of the outer core regions are the same. Only the shape of those outer regions changes.

Figure 12:
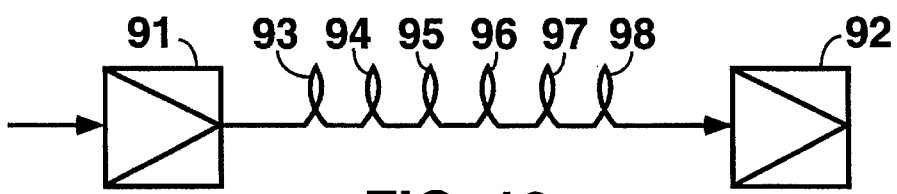
FIG. 12 schematically depicts a soliton communication system the transmission line of which comprises a plurality of serially connected fibers of constant dispersion, each fiber in the line having a dispersion lower than that of the preceding fiber.

The previous discussion has been concerned with systems wherein two amplifiers are connected by a dispersion decreasing fiber wherein dispersion continuously decreases along fiber length. In the embodiment of FIG. 12, amplifiers 91 and 92 are connected by a plurality of fibers 93 through 98 which are spliced together. Each of the fibers 93 through 98 has a dispersion that is substantially constant throughout its length. The dispersion of fiber 93 is the largest, and the dispersion of each of the fibers 94 through 98 is slightly smaller than the preceding fiber. This type of system is disclosed in the aforementioned C. Sien publication. In accordance with this invention, each of the fibers has a core of radius a surrounded by a cladding, the diameter of which is constant throughout its length. Furthermore, the diameters of the claddings of fibers 93 through 98 are substantially the same. The cores of each of the fibers 93 through 98 includes a central region that extends to the longitudinal axis of the fiber and an outer region, the inner and outer regions being separated by a region of depressed refractive index. Examples of suitable profiles are those of FIGS. 3, (a), 4(b), 4(d) through 4(j), 5(a) and 5(b).

We claim:

1. A single-mode optical waveguide fiber comprising
a core of transparent material having a maximum refractive index $n_1$, and
a layer of transparent cladding material on the outer surface of said core, the refractive index $n_2$ of said cladding being less than $n_1$, the outside diameter of said fiber being substantially constant along the length thereof,
the refractive profile of said core being such that fiber dispersion monotonically decreases along the fiber from one end thereof to the other, the minimum dispersion of said fiber being equal to or greater than zero, said fiber being a single section having no splices.

2. A single-mode optical waveguide fiber in accordance with claim 1 wherein the outside diameter of said core continually changes throughout the length of said fiber.

3. A single-mode optical waveguide fiber comprising
a core of transparent material having a maximum refractive index $n_1$ and a radius a,
a layer of transparent cladding material on the outer surface of said core, the refractive index $n_2$ of said cladding being less than $n_1$,
said core including at least one region of depressed refractive index, the inner radius $a_1$ of the innermost of said regions of depressed refractive index being greater than zero and the maximum radius $a_o$ of the outermost of said regions of depressed refractive index being less than a, the refractive index profile of said core being such that fiber dispersion monotonically decreases along the fiber from one end thereof to the other.

4. A single-mode optical waveguide fiber comprising
a core of transparent material having a maximum refractive index $n_1$, said core including a central region that extends to the longitudinal axis of said fiber and an outer region, said inner and outer regions being separated by an intermediate region where the refractive index abruptly changes from that of said central region to that of said outer region, and
a layer of transparent cladding material on the outer surface of said core, the refractive index $n_2$ of said cladding being less than $n_1$, the outside diameter of said fiber being substantially constant along the length thereof,
the refractive profile of said core being such that fiber dispersion monotonically decreases along the fiber from one end thereof to the other.

5. A single-mode optical waveguide fiber in accordance with claim 4 wherein said intermediate region comprises a region of depressed refractive index, the inner radius $a_1$ of said region of depressed refractive index being greater than zero and the maximum radius $a_o$ of said region of depressed refractive index being less than a.

6. A single-mode optical waveguide fiber in accordance with claim 5 wherein the refractive index profile of said central region changes throughout the length of said fiber, and the refractive index profile of said outer region remains constant throughout the length of said fiber.

7. A single-mode optical waveguide fiber in accordance with claim 5 wherein the refractive index profile of said central region remains constant throughout the length of said fiber, and the refractive index profile of said outer region changes throughout the length of said fiber.

8. A single-mode optical waveguide fiber in accordance with claim 5 wherein the refractive index profile of said central region changes throughout the length of said fiber, and the refractive index profile of said outer region changes throughout the length of said fiber.

9. A single-mode optical waveguide fiber in accordance with claim 5 wherein the refractive index profile of said central region decreases with increasing radius.

10. A single-mode optical waveguide fiber in accordance with claim 5 wherein the refractive index profile of said central region is substantially constant.

11. A single-mode optical waveguide fiber in accordance with claim 5 wherein said outer region includes at least two annular regions separated by a region of decreased refractive index.

12. A single-mode optical waveguide fiber in accordance with claim 5 wherein said fiber comprises a plurality of fiber sections that are fused together in series, the dispersion of each of said fiber sections being substantially constant throughout its length, the fiber section at a first end of said series having a given dispersion and the fiber section at the opposite end of said series having a dispersion lower than said given dispersion, and the dispersion of each of the remaining fibers sections being intermediate the dispersions of the fiber sections on opposite ends thereof.

13. A single-mode optical waveguide fiber comprising
a core of transparent material having a maximum refractive index $n_1$, said core including a central region that extends to the longitudinal axis of said fiber and an outer region located outside that core radius where power increases with longer wavelength, the radius and refractive index profile of said outer region being such that the dispersion effects of said outer region balance the dispersion effects of said inner core region and provide said fiber with the desired dispersion value, and
a layer of transparent cladding material on the outer surface of said core, the refractive index $n_2$ of said cladding being less than $n_1$, the outside diameter of said fiber being substantially constant along the length thereof,
the refractive profile of said core being such that fiber dispersion monotonically decreases along the fiber from one end thereof to the other.

14. A single-mode optical waveguide fiber in accordance with claim 13 wherein the minimum refractive index of said central region is equal to the maximum refractive index of said outer region.

15. A single-mode optical waveguide fiber in accordance with claim 14 wherein both said central region and said outer region have step-type refractive index profiles.

16. A single-mode optical waveguide fiber comprising a core of transparent material having a maximum refractive index $n_1$, the outside diameter of said core being substantially constant throughout the length of said fiber, and a layer of transparent cladding material on the outer surface of said core, the refractive index $n_2$ of said cladding being less than $n_1$, the outside diameter of said fiber being substantially constant along the length thereof, the refractive profile of said core being such that fiber dispersion monotonically decreases along the fiber from one end thereof to the other, said fiber being a single section having no splices.

* * * * *